(12) United States Patent
Oya et al.

(10) Patent No.: US 10,477,052 B2
(45) Date of Patent: Nov. 12, 2019

(54) IMAGE PROCESSING DEVICE, IMAGE READING APPARATUS AND NON-TRANSITORY COMPUTER READABLE MEDIUM STORING PROGRAM

(71) Applicant: FUJI XEROX CO., LTD., Tokyo (JP)

(72) Inventors: Kazuhiro Oya, Yokohama (JP);
Kunihiko Kobayashi, Yokohama (JP);
Shigeru Okada, Yokohama (JP);
Shintaro Adachi, Yokohama (JP);
Hiroyuki Kishimoto, Yokohama (JP);
Akane Yoshizaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 107 days.

(21) Appl. No.: 15/251,474

(22) Filed: Aug. 30, 2016

(65) Prior Publication Data
US 2017/0244851 A1    Aug. 24, 2017

(30) Foreign Application Priority Data
Feb. 22, 2016  (JP) ................ 2016-030566

(51) Int. Cl.
*H04N 1/00* (2006.01)
*G06K 9/00* (2006.01)
*G06K 9/32* (2006.01)
*G06K 9/34* (2006.01)

(52) U.S. Cl.
CPC ..... *H04N 1/00809* (2013.01); *G06K 9/00463* (2013.01); *G06K 9/3208* (2013.01); *G06K 9/342* (2013.01); *H04N 1/00816* (2013.01); *G06K 2209/01* (2013.01); *H04N 2201/0094* (2013.01)

(58) Field of Classification Search
CPC ............ G06K 2209/01; G06K 9/3208; G06K 9/00463; H04N 1/3877; H04N 1/00721; H04N 1/00809; H04N 1/3878; H04N 1/00816; H04N 1/00718
See application file for complete search history.

(56) References Cited

U.S. PATENT DOCUMENTS

| | | | |
|---|---|---|---|
| 5,508,810 A * | 4/1996 | Sato ................ | G06K 9/3208 358/296 |
| 6,151,423 A * | 11/2000 | Melen ............... | G06K 9/3208 382/289 |
| 6,798,905 B1 | 9/2004 | Sugiura et al. | |
| 6,804,414 B1 * | 10/2004 | Sakai ............... | G06K 9/3208 358/488 |

(Continued)

FOREIGN PATENT DOCUMENTS

| JP | H11-32143 A | 2/1999 |
|---|---|---|
| JP | H11-195085 A | 7/1999 |
| JP | 2000-083141 A | 3/2000 |

*Primary Examiner* — Jingge Wu
(74) *Attorney, Agent, or Firm* — Oliff PLC (57) ABSTRACT

An image processing device includes: an obtaining unit that obtains image information of a second region to detect an erecting direction of an image formed on a document, the second region being defined in the image in advance according to a criterion different from a criterion for defining a first region in the image, in which character recognition is performed; and an output unit that outputs character information of the first region, the character information being recognized in accordance with the erecting direction of the image obtained from the image information.

17 Claims, 9 Drawing Sheets

(56) References Cited

U.S. PATENT DOCUMENTS

| | | | | |
|---|---|---|---|---|
| 7,151,860 B1* | 12/2006 | Sakai | B42C 1/12 | 382/297 |
| 8,023,770 B2* | 9/2011 | Ferman | G06K 9/3208 | 382/289 |
| 8,340,430 B2* | 12/2012 | Campbell | G06K 9/3208 | 382/190 |
| 9,552,527 B1* | 1/2017 | Daher | G06K 9/3208 | |
| 2005/0021559 A1* | 1/2005 | Usuda | G06F 17/30876 | |
| 2007/0116363 A1* | 5/2007 | Iida | G06K 9/2054 | 382/182 |
| 2008/0239131 A1* | 10/2008 | Thorn | G06K 9/00248 | 348/333.01 |
| 2009/0015887 A1* | 1/2009 | Ohk | H04N 1/00681 | 358/488 |
| 2009/0022426 A1* | 1/2009 | Yamazaki | G01C 21/3673 | 382/296 |
| 2009/0316235 A1* | 12/2009 | Morimoto | H04N 1/00408 | 358/527 |
| 2010/0231953 A1* | 9/2010 | Miyazaki | G03G 15/5062 | 358/1.15 |
| 2010/0246972 A1* | 9/2010 | Koyama | G06K 9/3283 | 382/199 |
| 2011/0188759 A1* | 8/2011 | Filimonova | G06K 9/46 | 382/195 |
| 2012/0045129 A1* | 2/2012 | Sun | G06K 9/00456 | 382/176 |
| 2012/0154544 A1* | 6/2012 | Sato | H04N 13/0022 | 348/47 |
| 2013/0070273 A1* | 3/2013 | Nagata | H04N 1/00204 | 358/1.13 |
| 2014/0168707 A1* | 6/2014 | Ikeno | H04N 1/00225 | 358/1.16 |
| 2014/0307959 A1* | 10/2014 | Filimonova | G06K 9/00449 | 382/159 |
| 2014/0369602 A1* | 12/2014 | Meier | G06K 9/00463 | 382/182 |
| 2015/0012339 A1* | 1/2015 | Onischuk | G07C 13/00 | 705/12 |
| 2015/0049945 A1* | 2/2015 | Chang | G06K 9/00241 | 382/173 |
| 2015/0109642 A1* | 4/2015 | Gabe | H04N 1/00809 | 358/448 |
| 2017/0124390 A1* | 5/2017 | Koyanagi | G06K 9/00456 | |
| 2017/0330334 A1* | 11/2017 | Takakura | G06T 7/246 | |
| 2019/0037173 A1* | 1/2019 | Lee | H04W 76/15 | |

* cited by examiner

0 DEGREES

FIG.3B

90 DEGREES

FIG.3C

180 DEGREES

FIG.3D

270 DEGREES

IMAGE PROCESSING DEVICE, IMAGE READING APPARATUS AND NON-TRANSITORY COMPUTER READABLE MEDIUM STORING PROGRAM

CROSS REFERENCE TO RELATED APPLICATION

This application is based on and claims priority under 35 USC § 119 from Japanese Patent Application No. 2016-030566 filed Feb. 22, 2016.

BACKGROUND

Technical Field

The present invention relates to an image processing device, an image reading apparatus and a non-transitory computer readable medium storing a program.

Related Art

In recent years, techniques for determining a direction of a document, and if the direction cannot be determined, applying another process of determining the direction have been suggested.

SUMMARY

According to an aspect of the present invention, there is provided an image processing device including: an obtaining unit that obtains image information of a second region to detect an erecting direction of an image formed on a document, the second region being defined in the image in advance according to a criterion different from a criterion for defining a first region in the image, in which character recognition is performed; and an output unit that outputs character information of the first region, the character information being recognized in accordance with the erecting direction of the image obtained from the image information.

BRIEF DESCRIPTION OF THE DRAWINGS

An exemplary embodiment of the present invention will be described in detail based on the following figures, wherein.

DETAILED DESCRIPTION

Hereinafter, an exemplary embodiment according to the present invention will be described in detail with reference to attached drawings.

<Hardware Configuration of Image Processing Device>

Figure 1:
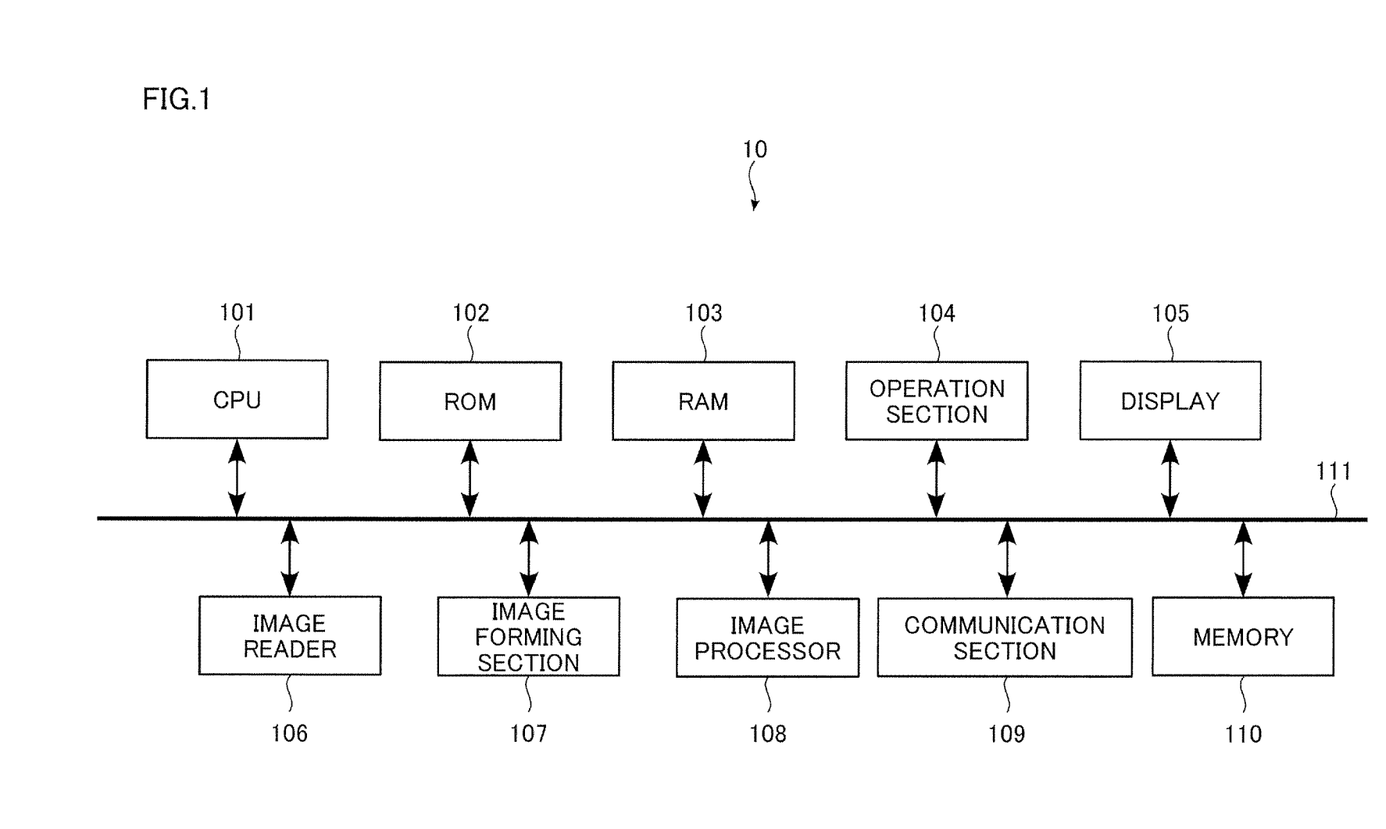
FIG. 1 is a diagram showing a hardware configuration example of an image processing device according to an exemplary embodiment.

First, a hardware configuration of an image processing device 10 according to the exemplary embodiment will be described. FIG. 1 is a diagram showing the hardware configuration example of the image processing device 10 according to the exemplary embodiment. The image processing device 10 according to the exemplary embodiment is an apparatus called a multifunction machine that includes, for example, a scanning function, a printing function, a copying function, a facsimile function and the like. As shown in FIG. 1, the image processing device 10 includes: a CPU (Central Processing Unit) 101; a ROM (Read Only Memory) 102; a RAM (Random Access Memory) 103; an operation section 104; a display 105; an image reader 106; an image forming section 107; an image processor 108; a communication section 109; and a memory 110. Note that the respective functional sections are connected to a bus 111, and performs data transmission and reception via the bus 111.

The CPU 101 executes various kinds of programs, such as an OS (Operating System) or application. Moreover, the ROM 102 is a memory that stores a control program executed by the CPU 101. The RAM 103 is a memory used as a working memory or the like for the CPU 101. Then, the CPU 101 reads the control program stored in the ROM 102 and executes the control program using the RAM 103 as a work area. When the control program is executed by the CPU 101, each function in the image processing device 10 is implemented.

The operation section 104 accepts operations by a user. The operation section 104 is configured with, for example, hardware keys. Moreover, the operation section 104 is configured with, for example, a touch panel that outputs a control signal in response to a contact position. As a measure for detecting the contact, anything, such as a measure for detecting based on a pressure caused by the contact, or a measure for detecting based on static electricity of a contact item, may be used.

The display 105 is configured with, for example, a liquid crystal display, and displays data related to the image processing device 10. For example, the display 105 displays a screen referenced by a user when the user operates the image processing device 10.

The image reader 106 reads an image formed on a document that is set by a user or the like, and generates image data indicating the read image. Here, the image reader 106 is, for example, a scanner, in which a CCD system that reduces reflected light of light emitted to a document from a light source by a lens and receives the reduced reflected light by a CCD (Charge Coupled Devices), a CIS system that receives reflected light of light sequentially emitted to a document from an LED light source by a CIS (Contact Image Sensor), or the like is employed.

The image forming section 107 includes a print mechanism that forms an image on a recording medium, such as a sheet. Here, the image forming section 107 is, for example, a printer, and a printer of an electrophotographic system that forms an image by transferring toner attached to a photoreceptor onto a recording medium or a printer of an ink jet system that forms an image by ejecting ink onto a sheet may be used.

The image processing section 108 applies image processing, such as color correction or tone correction, to an image represented by image data.

The communication section 109 is connected to a not-shown communication line and functions as a communication interface that performs communication with other devices connected to the communication line. For example, via the communication section 109, transmission and reception of image data with other devices are performed.

The memory 110 includes a storage region, such as a hard disk device, and stores, for example, data received by the communication section 109 or data created by the image processing device 10.

Then, though details will be described later, the image processing device 10 according to the exemplary embodiment makes determination of an erecting direction of image data generated by reading an image formed on a document, to thereby recognize characters included in the image data. Here, the erecting direction refers to a direction in which the characters in the image are correctly readable. Moreover, for determination of the erecting direction or character recognition, for example, an OCR is used. The OCR is a technique for analyzing characters on image data and converting thereof into character data handled by a computer.

<Functional Configuration of Image Processing Device>

Figure 2:
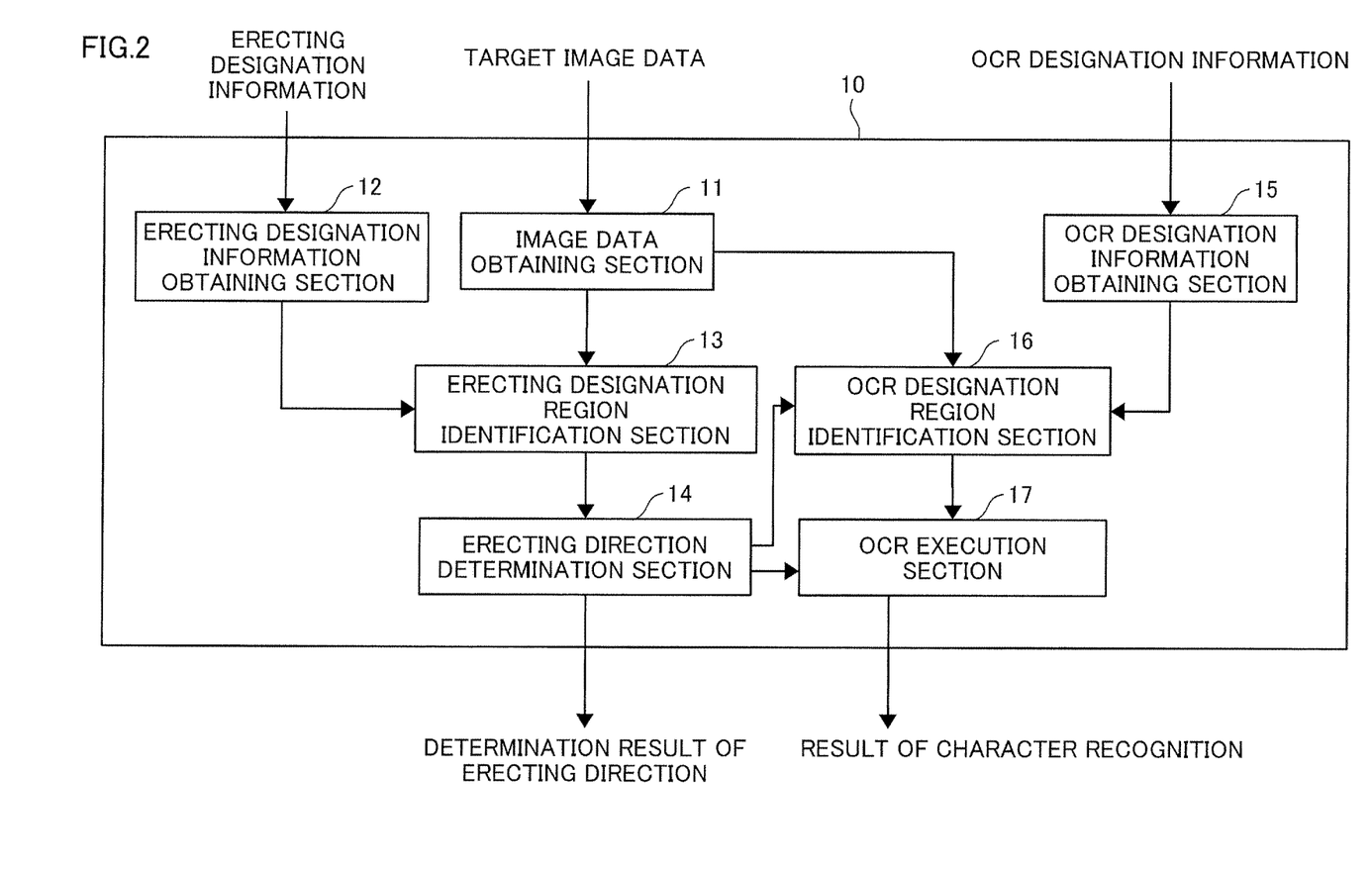
FIG. 2 is a block diagram showing a functional configuration example of the image processing device according to the exemplary embodiment.

Next, a functional configuration of the image processing device 10 according to the exemplary embodiment will be described. FIG. 2 is a block diagram showing a functional configuration example of the image processing device 10 according to the exemplary embodiment. The image processing device 10 includes: an image data obtaining section 11; an erecting designation information obtaining section 12; an erecting designation region identification section 13; an erecting direction determination section 14; an OCR designation information obtaining section 15; an OCR designation region identification section 16; and an OCR execution section 17.

The image data obtaining section 11 obtains image data which the image reader 106 generated by reading an image formed on a document. The image data is a target of erecting direction determination and character recognition, and is referred to as target image data, hereinafter.

The erecting designation information obtaining section 12, as an example of an positional information obtaining unit, obtains information for determining a position (hereinafter, referred to as an erecting designation information) of a region defined in advance as a region for performing erecting direction determination (detection) (hereinafter, referred to as an erecting designation region) in target image data. The erecting designation information is information representing a position of target image data in an image, such as, coordinate information. The erecting designation information is, for example, set in advance for each type of a document, and determined by input of the type of the document set in the image processing device 10 by a user. Moreover, for example, a user may confirm the content of the document and input the erecting designation information. Note that, in the exemplary embodiment, the erecting designation region is used as an example of a second region defined in advance for detecting the erecting direction of an image. Moreover, as an example of the positional information, the erecting designation information is used.

The erecting designation region identification section 13 identifies a position of an erecting designation region in target image data based on erecting designation information obtained by the erecting designation information obtaining section 12. Here, though details will be described later, the erecting designation region identification section 13 identifies the position of the erecting designation region in each of plural directions (for example, four directions) of the target image data based on the erecting designation information.

The erecting direction determination section 14, as an example of an obtaining unit and a determination unit, determines an erecting direction of the target image data (that is, the erecting direction of the document) based on the image information of the erecting designation region identified by the erecting designation region identification section 13. Here, the erecting direction determination section 14 recognizes the characters included in the erecting designation region by executing the OCR process on the erecting designation region, to thereby determine the erecting direction of the target image data. More specifically, for example, the erecting direction determination section 14 reads the characters included in the erecting designation region from the plural directions, and identifies the characters by checking the characters against predefined dictionary character patterns. By identifying the characters in the erecting designation region in this manner, the erecting direction of the target image data is determined. In other words, the erecting direction of the target image data can be grasped as a direction corresponding to a predefined dictionary character pattern.

Figure 3A:
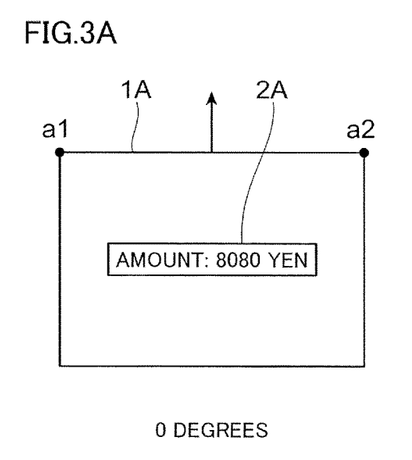
FIGS. 3A to 3D are diagrams for illustrating examples of an erecting direction determination process.

FIGS. 3A to 3D are diagrams for illustrating an example of the erecting direction determination process. The examples shown in the figures show target image data 1A in which characters "Amount: 8080 yen" is described on a document and a region 2A including the characters "Amount: 8080 yen" is the erecting designation region. In this case, regarding the target image data as shown in FIG. 3A, since the characters in the image can be read correctly, the erecting direction determination section 14 determines that the direction of 0 degrees is the erecting direction. More specifically, the direction of 0 degrees is a direction in which a long side composed of apexes a1 and a2 in the target image data 1A faces upward in the figure.

Figure 3B:
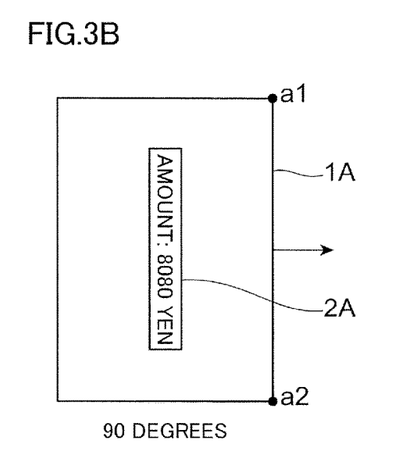
Figure 3C:
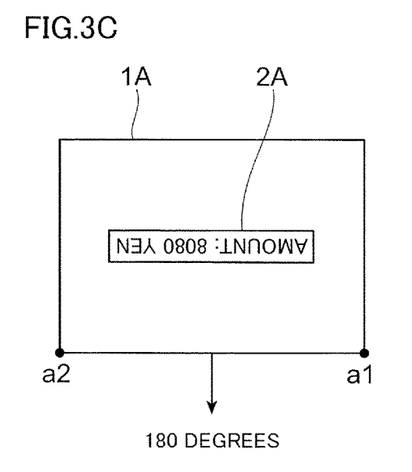
Figure 3D:
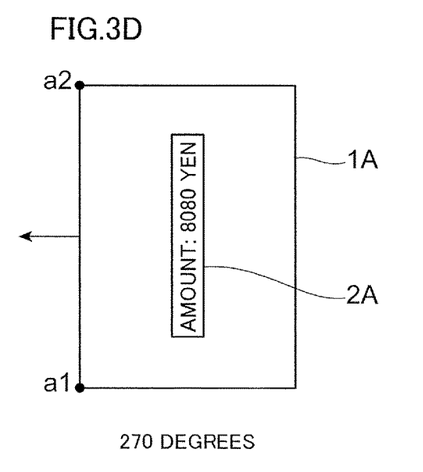

Moreover, regarding the target image data 1A as shown in FIGS. 3B, 3C and 3D, the erecting direction determination section 14 determines that the directions of 90 degrees, 180 degrees and 270 degrees are the erecting directions, respectively. More specifically, the direction of 90 degrees is a direction rotating 90 degrees the direction of 0 degrees in the clockwise direction, in which the long side composed of the apexes a1 and a2 in the target image data 1A faces toward a right side in the figure. In a similar manner, the direction of 180 degrees is a direction rotating 180 degrees the direction of 0 degrees in the clockwise direction, in which the long side composed of the apexes a1 and a2 in the target image data 1A faces downward in the figure. Moreover, the direction of 270 degrees is a direction rotating 270 degrees the direction of 0 degrees in the clockwise direction, in which the long side composed of the apexes a1 and a2 in the target image data 1A faces toward a left side in the figure.

The OCR designation information obtaining section 15 obtains information for determining a position (hereinafter, referred to as OCR designation information) of a region defined in advance as a region for performing character recognition (hereinafter, referred to as an OCR designation region) in the target image data. The OCR designation information is, similar to the erecting designation information, information representing a position of the target image data in an image, such as, coordinate information. The OCR designation information is, for example, set in advance for each type of a document, and determined by input of the type of the document set in the image processing device 10 by a user. Moreover, for example, a user may confirm the content of the document and input the OCR designation information. Note that, in the exemplary embodiment, the OCR designation region is used as an example of a first region in which character recognition is performed.

The OCR designation region identification section 16 identifies a position of an OCR designation region in the target image data based on the OCR designation information obtained by the OCR designation information obtaining section 15. Here, the OCR designation region identification section 16 identifies the position of the OCR designation region in accordance with the erecting direction of the target image data determined by the erecting direction determination section 14.

The OCR execution section 17, as an example of an output unit, recognizes the characters included in the OCR designation region (character information) by executing the OCR process on the OCR designation region identified by the OCR designation region identification section 16. Here, the OCR execution section 17 recognizes the characters included in the OCR designation region by executing the OCR process in accordance with the erecting direction of the target image data determined by the erecting direction determination section 14. More specifically, the OCR execution section 17 recognizes the characters in the OCR designation region based on the erecting direction of the target image data, to thereby identify the recognized characters by checking the characters against the predefined dictionary character patterns.

Note that each functional section constituting the image processing device 10 shown in FIG. 2 is implemented by cooperation of software and hardware resources. Specifically, the CPU 101 reads the programs for implementing the image data obtaining section 11, the erecting designation information obtaining section 12, the erecting designation region identification section 13, the erecting direction determination section 14, the OCR designation information obtaining section 15, the OCR designation region identification section 16, the OCR execution section 17 and the like, for example, from the ROM 102 into the RAM 103 and executes thereof, and accordingly, these functional sections are implemented.

<Process of Identifying Position of Erecting Designation Region>

Next, detailed description will be given of a process in which the erecting designation region identification section 13 identifies the position of the erecting designation region. FIGS. 4A to 4E, FIGS. 5A to 5E, FIGS. 6A and 6B, and FIGS. 7A to 7D are diagrams showing examples of the erecting designation regions identified by the erecting designation region identification section 13.

Figure 4A:
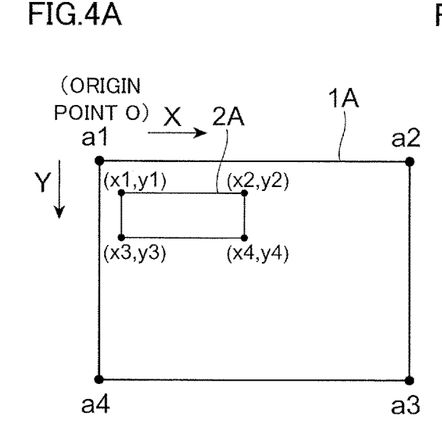
FIGS. 4A to 4E are diagrams showing examples of erecting designation regions identified by an erecting designation region identification section.

First, in the specific examples shown in FIGS. 4A to 4E, it is assumed that erecting designation information stipulates that a rectangle constituted by four points of coordinates (x1, y1), (x2, y2), (x3, y3) and (x4, y4) is regarded as an erecting designation region. Here, for example, as shown in FIG. 4A, by assuming an apex a1 on the top left in the figure of the target image data 1A as an origin point O and defining the X axis in the right direction in the figure and the Y axis in the downward direction in the figure, the region 2A is identified as an erecting designation region.

Figure 4B:
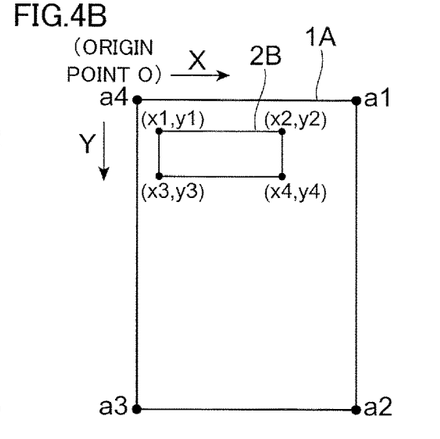

On the other hand, for example, if the document is set in a state of being rotated 90 degrees in the clockwise direction from the state shown in FIG. 4A, the position of the erecting designation region to be identified is changed. More specifically, as shown in FIG. 4B, by assuming an apex a4 on the top left in the figure of the target image data 1A as the origin point O and defining the X axis in the right direction in the figure and the Y axis in the downward direction in the figure, the region 2B is identified as the erecting designation region.

Figure 4C:
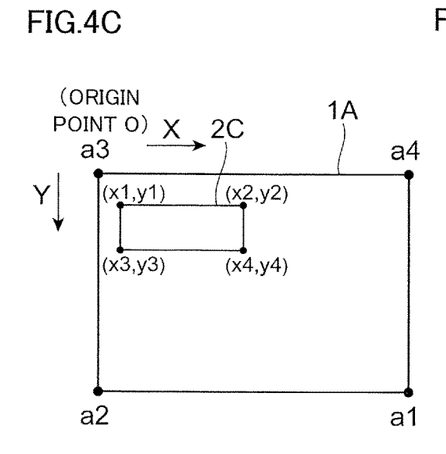
Figure 4D:
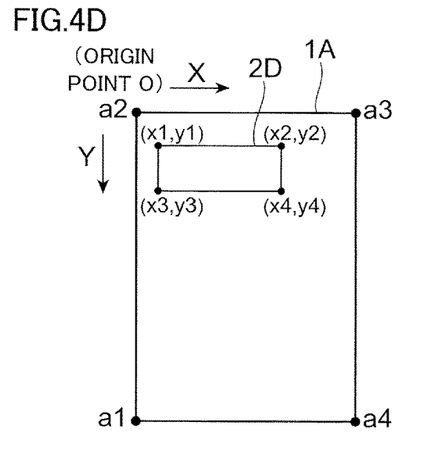

Similarly, if the document is set in a state of being rotated 180 degrees in the clockwise direction from the state shown in FIG. 4A, as shown in FIG. 4C, an apex a3 on the top left in the figure of the target image data 1A is assumed to be the origin point O, and the region 2C is identified as the erecting designation region. Moreover, if the document is set in a state of being rotated 270 degrees in the clockwise direction from the state shown in FIG. 4A, as shown in FIG. 4D, an apex a2 on the top left in the figure of the target image data 1A is assumed to be the origin point O, and the region 2D is identified as the erecting designation region.

Figure 4E:
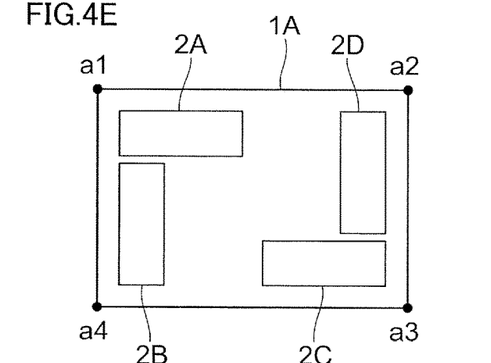

In this manner, the position to be identified by the erecting designation information is changed in accordance with the direction of the document set by the user in some cases. Therefore, the erecting designation region identification section 13 identifies the position of the erecting designation region from four directions (directions of 0 degrees, 90 degrees, 180 degrees and 270 degrees) against the target image data based on the erecting designation information. In the specific examples shown in the figures, as shown in FIG. 4E, the erecting designation region identification section 13 identifies the regions 2A, 2B, 2C and 2D as the erecting designation regions.

Next, examples shown in FIGS. 5A to 5E and FIGS. 6A and 6B show the cases in which identified regions overlap each other as a result of identification of the erecting designation regions from the four directions against the target image data by the erecting designation region identification section 13. Note that, in the specific examples shown in FIGS. 5A to 5E and FIGS. 6A and 6B, similar to the examples shown in FIGS. 4A to 4E, it is assumed that the erecting designation information stipulates that the rectangle constituted by the four points of coordinates (x1, y1), (x2, y2), (x3, y3) and (x4, y4) is regarded as the erecting designation region.

Figure 5A:
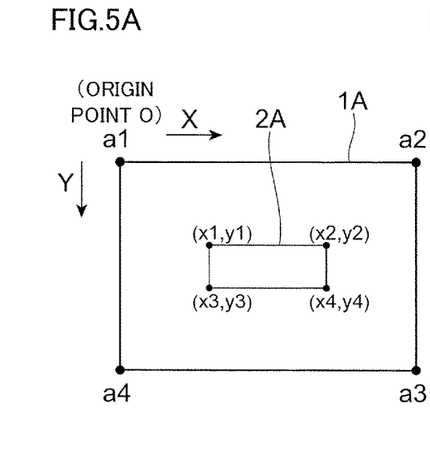
FIGS. 5A to 5E are diagrams showing examples of erecting designation regions identified by the erecting designation region identification section.
Figure 5B:
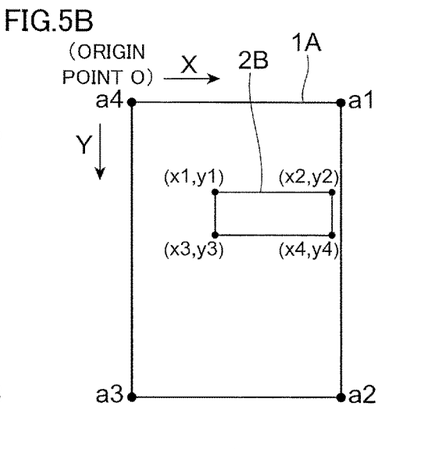
Figure 5C:
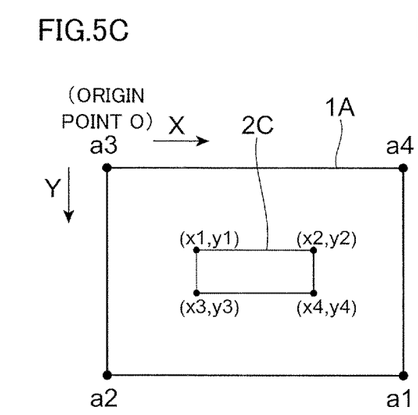
Figure 5D:
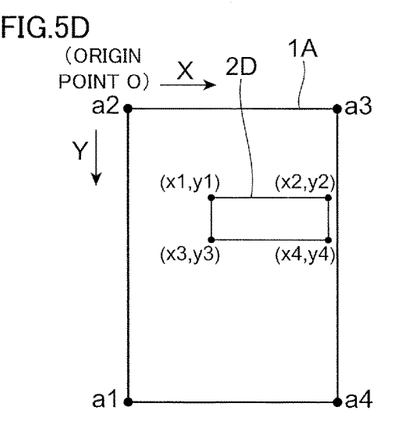

In this case, as shown in FIG. 5A, for example, if the apex a1 of the target image data 1A is assumed as the origin point O, the region 2A is identified as the erecting designation region. On the other hand, if the document is set in a state of being rotated 90 degrees in the clockwise direction from the state shown in FIG. 5A, as shown in FIG. 5B, the apex a4 is assumed as the origin point O, and the region 2B is identified as the erecting designation region. In a similar manner, if the apex a3 of the target image data 1A is assumed as the origin point O in accordance with the direction of setting of the document, as shown in FIG. 5C, the region 2C is identified as the erecting designation region. Moreover, if the apex a2 of the target image data 1A is assumed as the origin point O, as shown in FIG. 5D, the region 2D is identified as the erecting designation region.

Figure 5E:
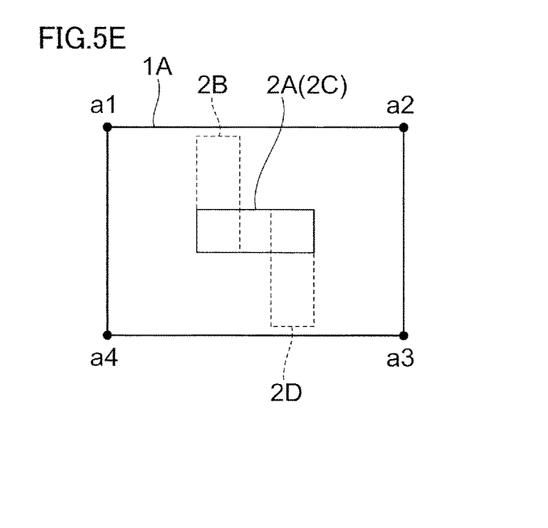

As a result, in the specific examples shown in the figures, as shown in FIG. 5E, the regions 2A and 2C overlap. In this manner, when the regions identified as the erecting designation regions overlap each other, the erecting designation region identification section 13 merges the overlapping regions and assumes thereof as an erecting designation region. Consequently, the erecting designation region identification section 13 identifies the regions 2A (or 2C), 2B, and 2D as the erecting designation regions.

Here, it can also be considered that conditions about whether or not the merge is conducted when the regions overlap each other are defined in advance, and the merge is conducted when the conditions are satisfied. For instance, in the specific example shown in FIG. 5E, parts of the regions 2A and 2B overlap each other. Here, for example, since ratio of the overlapping regions to the region 2A as a whole (or the region 2B as a whole) is small, it is assumed that the conditions for conducting the merge of the regions 2A and 2B are not satisfied; then, the erecting designation region identification section 13 identifies each of the regions 2A and 2B as the erecting designation region without merging thereof. On the other hand, in the specific example shown in FIG. 6A, for instance, since ratio of the overlapping regions to the region 2A as a whole (or the region 2C as a whole) exceeds a threshold value, it is assumed that the conditions for conducting the merge of the regions 2A and 2C are satisfied; then, the erecting designation region identification section 13 identifies a region 2E in a rectangular shape (the region represented by oblique lines in FIG. 6A) including both of the regions 2A and 2C as the erecting designation region.

Figure 6A:
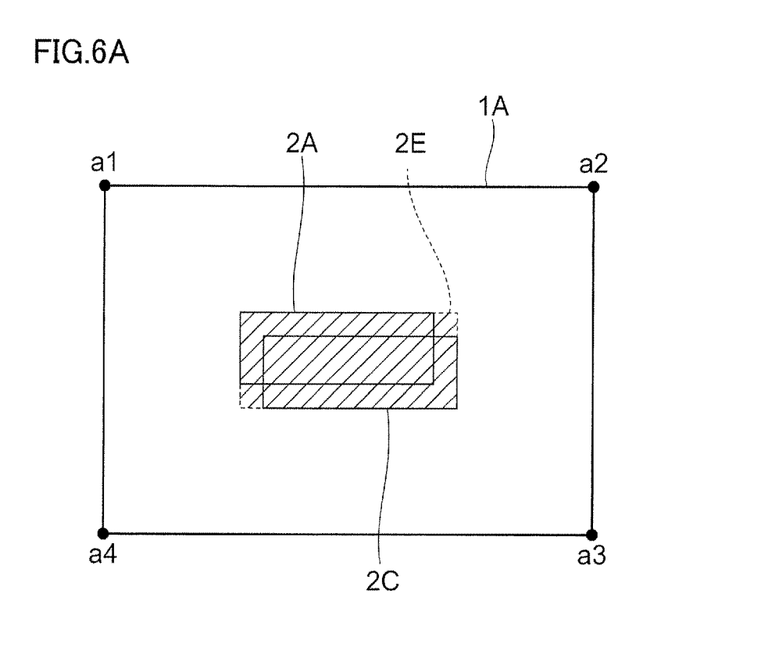
FIGS. 6A and 6B are diagrams showing examples of erecting designation regions identified by the erecting designation region identification section.
Figure 6B:
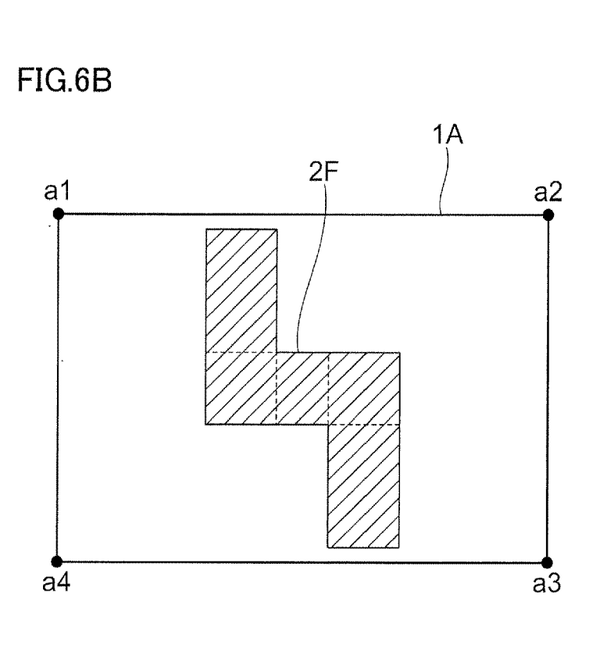

Further, in the specific examples shown in FIGS. 5E and 6A, it is assumed that the erecting designation region after merging has a rectangular shape; however, the shape of the erecting designation region after merging is not limited to the rectangular shape. For example, the erecting designation region identification section 13 may identify a region 2F (the region represented by oblique lines in FIG. 6B) obtained by summing the regions 2A (or 2C), 2B and 2D as the erecting designation region after merging.

Next, examples shown in FIGS. 7A to 7D show the cases in which identified regions extend off the target image data as a result of identification of the erecting designation regions from the four directions against the target image data by the erecting designation region identification section 13. Note that, in the specific examples shown in FIGS. 7A to 7D, similar to the examples shown in FIGS. 4A to 4E, it is assumed that the erecting designation information stipulates that the rectangle constituted by the four points of coordinates (x1, y (x2, y2), (x3, y3) and (x4, y4) is regarded as the erecting designation region.

Figure 7A:
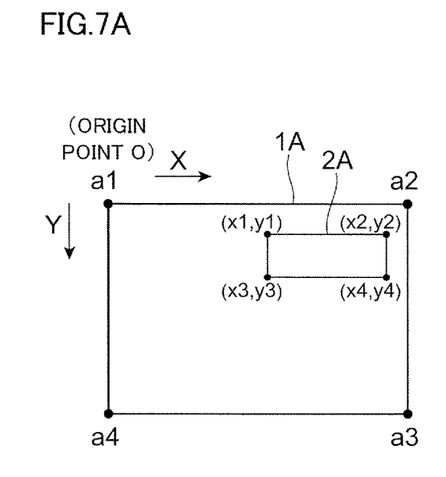
FIGS. 7A to 7D are diagrams showing examples of erecting designation regions identified by an erecting designation region identification section.
Figure 7B:
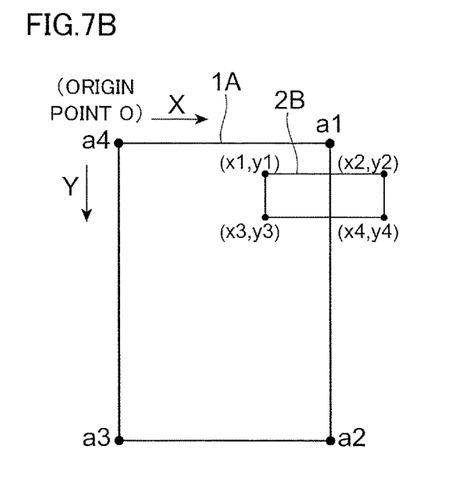
Figure 7C:
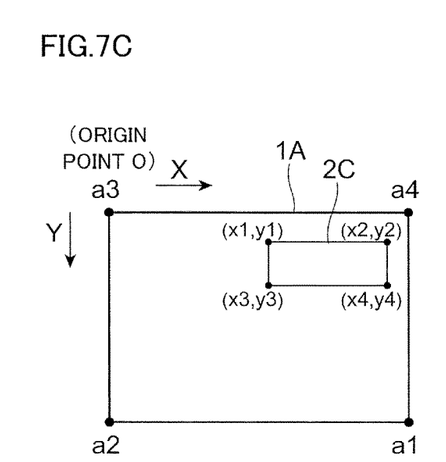

In this case, as shown in FIG. 7A, for example, if the apex a1 of the target image data 1A is assumed as the origin point O, the region 2A is identified as the erecting designation region. On the other hand, if the document is set in a state of being rotated 90 degrees in the clockwise direction from the state shown in FIG. 7A, as shown in FIG. 7B, the apex a4 is assumed as the origin point O, and the region 2B is identified as the erecting designation region. In a similar manner, if the apex a3 of the target image data 1A is assumed as the origin point O in accordance with the direction of setting of the document, as shown in FIG. 7C, the region 2C is identified as the erecting designation region. Moreover, if the apex a2 of the target image data 1A is assumed as the origin point O, as shown in FIG. 7D, the region 2D is identified as the erecting designation region.

Figure 7D:
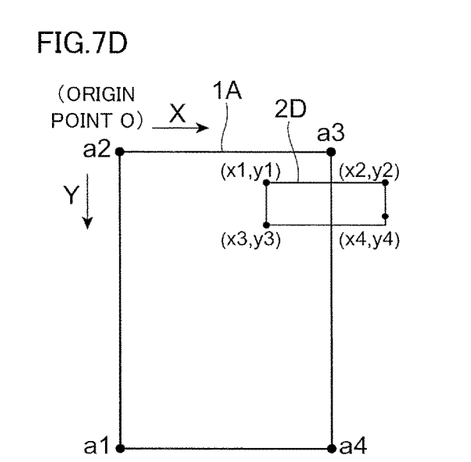

As a result, as shown in FIGS. 7B and 7D, the regions 2B and 2D extend off the target image data 1A. Like this, when the region identified as the erecting designation region extends off the target image data 1A, the erecting designation region identification section 13 excludes the extending-off region from the erecting designation region, and regards the region that is left without being excluded as the erecting designation region. Consequently, in the specific examples shown in FIGS. 7A to 7D, the erecting designation region identification section 13 excludes the regions 2B and 2D that have extended off the target image data 1A from the erecting designation region. Then, the erecting designation region identification section 13 identifies the regions 2A and 2C that are left without being excluded as the erecting designation regions.

<Specific Examples of Process of Erecting Direction Determination and Character Recognition>

Figure 8A:
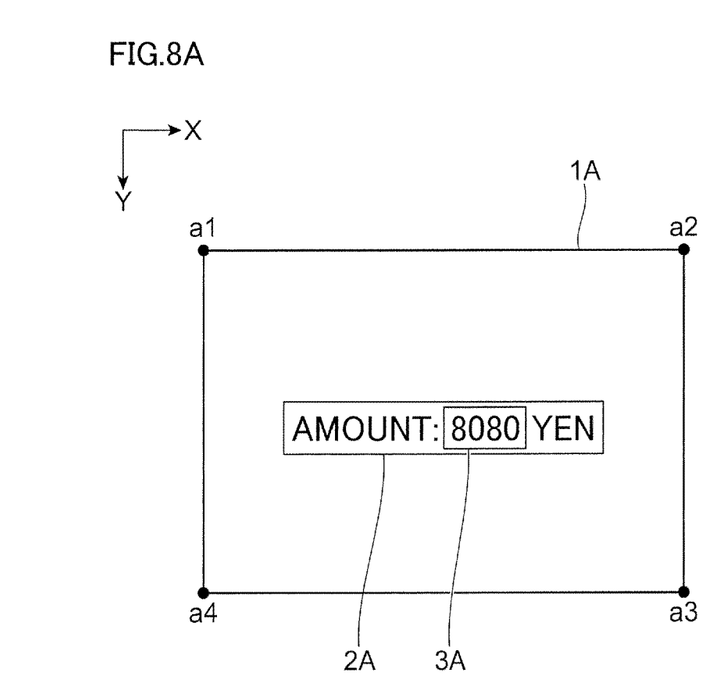
FIGS. 8A and 8B are diagrams for illustrating examples of a process of erecting direction determination and character recognition.
Figure 8B:
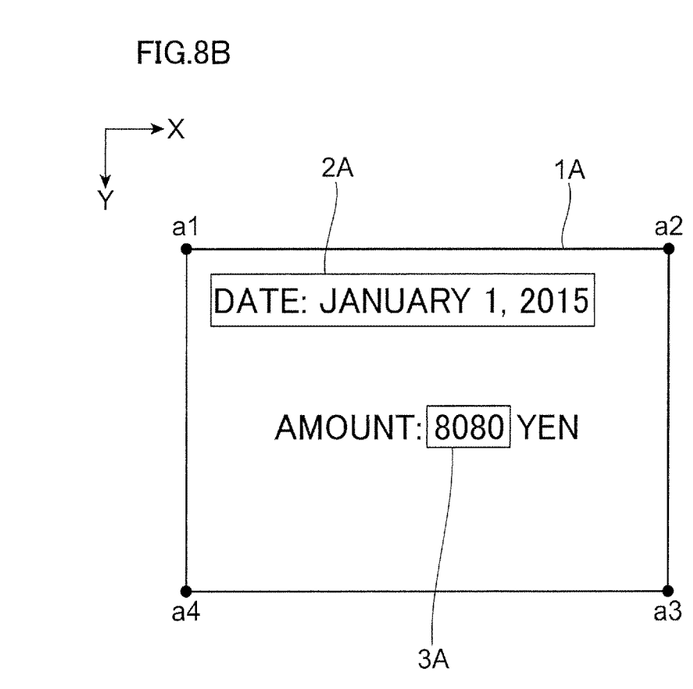

Next, a process of erecting direction determination and character recognition will be described with reference to specific examples. FIGS. 8A and 8B are diagrams for illustrating examples of a process of erecting direction determination and character recognition. Here, an orthogonal coordinate system is considered in the target image data 1A shown in FIGS. 8A and 8B, in which the X axis and the Y axis are defined in the right direction and in the downward direction in the figure, respectively, and a coordinate in the lateral direction and a coordinate in the longitudinal direction in the target image data 1A are defined as the x-coordinate and the y-coordinate, respectively.

First, in the specific example shown in FIG. 8A, the characters "Amount: 8080 yen" are described on a document of the target image data 1A, and the region 2A including the characters "Amount: 8080 yen" is the erecting designation region. Here, the erecting designation region identification section 13 identifies the position of the region 2A as the erecting designation region in the target image data 1A based on the erecting designation information. Then, the erecting direction determination section 14 recognizes the characters "Amount: 8080 yen" included in the region 2A by executing the OCR process, to thereby determine the erecting direction of the target image data 1A.

More specifically, for example, the erecting direction determination section 14 reads the characters included in the region 2A one by one from four directions of 0 degrees, 90 degrees, 180 degrees and 270 degrees, and checks the characters against predefined dictionary character patterns. Then, the erecting direction determination section 14 identifies those having the closest characteristics in the dictionary character patterns in each of the four directions. On that occasion, the erecting direction determination section 14 also calculates a confidence factor indicating a degree of closeness in characteristics. Then, the erecting direction determination section 14 regards the character pattern having the highest confidence factor among the confidence factors calculated as to the four directions as a character recognition result, and determines the direction thereof as the erecting direction.

For example, assuming that attention is paid to "A" in "Amount: 8080 yen", the erecting direction determination section 14 cuts a rectangle enclosing the character "A", and performs character recognition thereon from the four directions. In the case of the character "A", in the predefined dictionary character patterns, the character pattern having the closest characteristics is "A". Then, the direction thereof is the direction of 0 degrees (the direction in which a long side composed of apexes a1 and a2 in the target image data 1A faces upward in the figure). Therefore, the erecting direction determination section 14 determines that the direction of 0 degrees is the erecting direction of the target image data 1A.

Similarly, the erecting direction determination section 14 reads each of the other characters included in the region 2A from the four directions to make a determination about the erecting direction. Then, for example, as a result of determining the erecting direction regarding each of the characters in the region 2A, the erecting direction determination section 14 determines the direction having the highest frequency in determination as the erecting direction of the target image data 1A.

Note that, only the region 2A is shown as the erecting designation region in the specific example shown in FIG. 8A; however, as shown in FIGS. 4A to 4E, FIGS. 5A to 5E, FIGS. 6A and 6B, and FIGS. 7A to 7D, the erecting designation region is identified as to the target image data 1A in the four directions. Then, the erecting direction determination section 14 similarly determines the erecting direction as to the erecting designation regions other than the region 2A. Finally, for example, as a result of determining the erecting direction regarding each of the erecting designation regions, the erecting direction determination section 14 determines the direction having the highest frequency in determination as the erecting direction of the target image data 1A. In the specific example shown in FIG. 8A, the direction of 0 degrees is outputted as the erecting direction of the target image data 1A.

Here, among the characters "Amount: 8080 yen", for example, the character "8" or "0" has a possibility of being recognized as "8" or "0" even though the characters are flipped vertically. In other words, "8" and "0" have a possibility of being recognized as characters of high confidence factor in both cases of performing character recognition from the direction of 0 degrees and performing character recognition from the direction of 180 degrees. Therefore, for example, if the erecting direction is determined based on "8080" constituted only by the characters "8" and "0", it can be considered that the erecting direction becomes indeterminable, or the erecting direction is incorrectly recognized.

On the other hand, for example, the character "A (in Amount)" or "y (in yen)" is not correctly read when being flipped vertically or rotated 90 degrees in the right direction or the left direction. In other words, it can be said that the character "A" or "y" is a character that causes recognition difficulty when the target image data 1A is rotated from the erecting direction. If the erecting direction is determined based on such a character, there is a high possibility that the erecting direction of the target image data 1A is correctly determined.

In this way, determination accuracy of the erecting direction is affected by complexity, shape or the like of the characters to be determined. Therefore, in the exemplary embodiment, the position of the erecting designation region is defined so that a character for uniquely determining the erecting direction of the target image data, in other words, a character that causes recognition difficulty when the target image data is rotated from the erecting direction is included in the erecting designation region based on the erecting designation information. On the other hand, the position of the OCR designation region is defined so that, for example, the area on which the user wants to perform character recognition is included. In this manner, it can be said that the OCR designation region and the erecting designation region are defined by different criteria.

Moreover, in the specific example shown in FIG. 8A, the region 3A including the characters "8080" is the OCR designation region. Here, the OCR designation region identification section 16 identifies the position of the region 3A based on the OCR designation information in accordance with the erecting direction determined by the erecting direction determination section 14 (that is, the direction of 0 degrees). To additionally describe, the OCR designation region identification section 16 does not identify the position of the region 3A from the plural directions (for example, four directions) of the target image data 1A as the erecting designation region identification section 13 does, but may identify the position of the region 3A from the erecting direction determined by the erecting direction determination section 14.

Then, the OCR execution section 17 executes the OCR process in accordance with the erecting direction (the direction of 0 degrees), to thereby recognize the characters included in the region 3A. To additionally describe, the OCR execution section 17 does not read the characters from the four directions as the erecting direction determination section 14 does, but may read the characters from the erecting direction determined by the erecting direction determination section 14 and check the characters against the predefined dictionary character patterns to perform character recognition. In the specific example shown in FIG. 8A, the characters "8080" are outputted as the recognition result.

Next, in the specific example shown in FIG. 8B, the characters "Date: Jan. 1, 2015" and "Amount: 8080 yen" are described on a document of the target image data 1A. Then, the region 2A including the characters "Date: Jan. 1, 2015" is the erecting designation region. Moreover, the region 3A including the characters "8080" is the OCR designation region.

Here, the erecting designation region identification section 13 identifies the position of the region 2A as the erecting designation region of the target image data 1A based on the erecting designation information. Then, the erecting direction determination section 14 recognizes the characters "Date: Jan. 1, 2015" included in the region 2A by executing the OCR process, to thereby determine the erecting direction of the target image data 1A. In the specific example shown in FIG. 8B, the direction of 0 degrees (the direction in which a long side composed of apexes a1 and a2 in the target image data 1A faces upward in the figure) is outputted as the erecting direction of the target image data 1A.

Moreover, the OCR designation region identification section 16 identifies the position of the region 3A based on the OCR designation information in accordance with the erecting direction determined by the erecting direction determination section 14 (that is, the direction of 0 degrees). Then, the OCR execution section 17 executes the OCR process in accordance with the erecting direction (the direction of 0 degrees), to thereby recognize the characters included in the region 3A. In the specific example shown in FIG. 8B, the characters "8080" are outputted as the recognition result.

Note that, among the characters "Date: Jan. 1, 2015", for example, characters of the alphabet, such as "D", "a", "t" and the like or numerical characters, such as "2", "5" and the like are not correctly read when being flipped vertically or rotated 90 degrees in the right direction or the left direction. In other words, it can be said that the characters causing recognition difficulty when the target image data 1A is rotated from the erecting direction are included in the region 2A, which is the erecting designation region.

Moreover, in FIGS. 8A and 8B, description has been given of the examples in which the OCR designation region and the erecting designation region are the different regions; however, it is assumed that, in some cases, as a result of defining each of those regions according to a different criterion, the regions coincide with each other.

<Processing Procedures by Image Processing Device>

Figure 9:
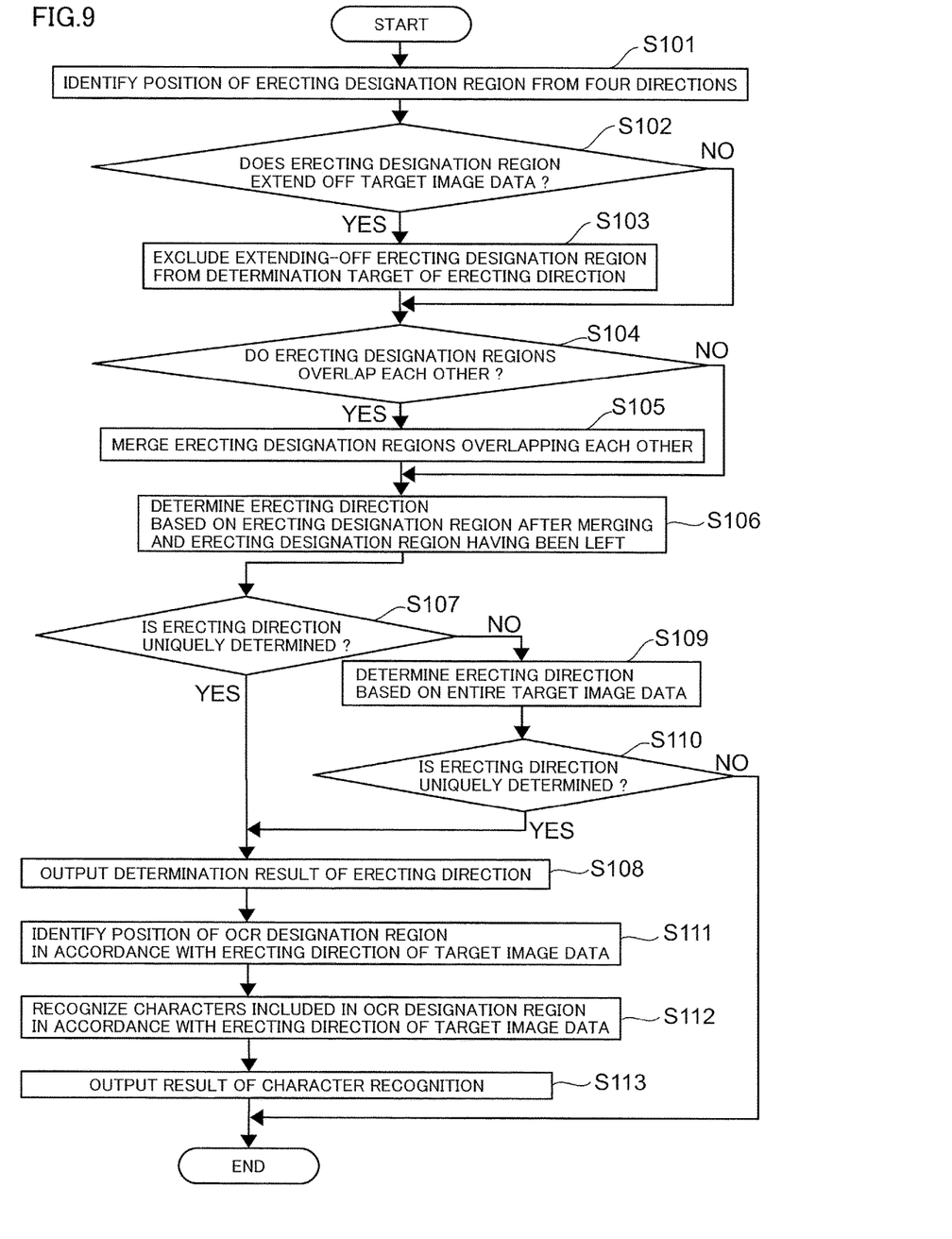
FIG. 9 is a flowchart showing an example of procedures performing the process of erecting direction determination and character recognition by the image processing device.

Next, description will be given of procedures performing the process of erecting direction determination and character recognition by the image processing device 10. FIG. 9 is a flowchart showing an example of the procedures performing the process of erecting direction determination and character recognition by the image processing device 10.

First, the erecting designation region identification section 13 identifies the position of the erecting designation region from four directions of the target image data based on the erecting designation information obtained by the erecting designation information obtaining section 12 (step 101). Next, the erecting designation region identification section 13 determines whether or not the identified erecting designation region extends off the target image data (step 102). If the erecting designation region extends off the target image data (Yes in step 102), the erecting designation region identification section 13 excludes the extending-off erecting designation region from the determination target of the erecting direction (step 103).

Subsequent to step 103, or in the case where negative determination is made in step 102 (No in step 102), the erecting designation region identification section 13 determines whether or not the erecting designation regions that are left without being excluded overlap each other (step 104). If the erecting designation regions overlap each other (Yes in step 104), the erecting designation region identification section 13 merges the erecting designation regions overlapping each other (step 105). Here, as the examples shown in FIGS. 5A to 5E and FIGS. 6A and 6B, the conditions for merging the erecting designation regions or how the shape of the erecting designation region after merging will be may be set in advance.

Next, the erecting direction determination section 14 executes the OCR process on the erecting designation region after merging and the erecting designation region that has not been merged but has been left without being excluded, to thereby recognize the characters included in each of the erecting designation regions and determine the erecting direction of the target image data (step 106). Then, the erecting direction determination section 14 determines whether or not the erecting direction is uniquely determined (step 107). If the erecting direction is uniquely determined (Yes in step 107), the erecting direction determination section 14 outputs the determination result of the erecting direction (step 108). Here, the outputted determination result of the erecting direction may be displayed, for example, on the screen of the display 105.

On the other hand, if the erecting direction is not uniquely determined (if the erecting direction determination section cannot be determined) (No in step 107), the erecting direction determination section 14 determines the erecting direction of the target image data by executing the OCR process on the entire target image data (step 109). Here, the erecting direction determination section 14 performs character recognition by the OCR process based on the image information of the entire target image data, to thereby determine the erecting direction. Next, the erecting direction determination section 14 determines whether or not the erecting direction is uniquely determined (step 110). If the erecting direction is uniquely determined (Yes in step 110), the process proceeds to step 108. On the other hand, if the erecting direction is not uniquely determined (No in step 110), the process flow is terminated.

Subsequent to step 108, the OCR designation region identification section 16 identifies the position of the OCR designation region in accordance with the erecting direction of the target image data determined by the erecting direction determination section 14 based on the OCR designation information (step 111). Next, the OCR execution section 17 recognizes the characters included in the OCR designation region by executing the OCR process on the OCR designation region in accordance with the erecting direction of the target image data (step 112). Then, the OCR execution section 17 outputs the result of character recognition (step 113). The outputted result of character recognition is displayed, for example, on the screen of the display 105. Then, the process flow is completed.

As described above, in the exemplary embodiment, the erecting designation region and the OCR designation region are defined on the image data of the image formed on the document. Then the erecting direction determination section 14 determines the erecting direction of the image based on the image information of the erecting designation region. By the erecting direction determination process of the erecting direction determination section 14 in this manner, for example, as compared to the case in which a direction of a document is determined by use of image information of the entire document, a processing load of the image processing device 10 required to determine the erecting direction is reduced, and thereby determination is made at high speed.

Moreover, the OCR designation region identification section 16 or the OCR execution section 17 may perform identification of the OCR designation region or character recognition in the OCR designation region in accordance with the erecting direction determined by the erecting direction determination section 14. Further, to prevent the position of the erecting designation region from being identified incorrectly in accordance with the direction of the document set by a user or the like, the erecting designation region identification section 13 identifies the position of the erecting designation region form plural directions of the target image data.

Note that, it is possible to provide a program that implements the exemplary embodiment according to the present invention by a communication tool, of course, and it is also possible to store thereof in a storage medium, such as a CD-ROM, to be provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a processor and associated memory configured to:
obtain image information of a second region to detect by way of character recognition of the second region an erecting direction of an image formed on a document, the second region being defined in the image in advance for each of a plurality of types of the document according to a criterion different from a criterion for defining a first region in the image, in which character recognition is performed; and
output character information of the first region, the character information being recognized in accordance with the erecting direction of the image obtained from the image information,
wherein an erecting direction of the first region is indeterminable by the character recognition.

2. The image processing device according to claim 1, wherein the processor is further configured to:
  obtain positional information to define a position of the second region; and
  determine the erecting direction of the image based on the image information of each of a plurality of the second regions identified in each of a plurality of directions of the image based on the positional information.

3. The image processing device according to claim 2, wherein, as to the plurality of second regions identified in the respective directions, the processor excludes a second region that extends off the image, and determines the erecting direction of the image based on the image information of a second region that is left without being excluded.

4. The image processing device according to claim 2, wherein, as to the plurality of second regions identified in the respective directions, if there are second regions overlapping each other, the processor merges the overlapping second regions, and determines the erecting direction of the image based on image information of a second region after merging.

5. The image processing device according to claim 3, wherein, as to the plurality of second regions identified in the respective directions, if there are second regions overlapping each other, the processor merges the overlapping second regions, and determines the erecting direction of the image based on image information of a second region after merging.

6. The image processing device according to claim 2, wherein, if the erecting direction of the image cannot be determined based on the image information of the second region, the processor determines the erecting direction of the image based on image information of the image as a whole.

7. The image processing device according to claim 3, wherein, if the erecting direction of the image cannot be determined based on the image information of the second region, the processor determines the erecting direction of the image based on image information of the image as a whole.

8. The image processing device according to claim 4, wherein, if the erecting direction of the image cannot be determined based on the image information of the second region, the processor determines the erecting direction of the image based on image information of the image as a whole.

9. The image processing device according to claim 5, wherein, if the erecting direction of the image cannot be determined based on the image information of the second region, the processor determines the erecting direction of the image based on image information of the image as a whole.

10. The image processing device according to claim 1, wherein the position of the second region is defined to include a character that causes recognition difficulty when the image is rotated from the erecting direction in the second region.

11. The image processing device according to claim 2, wherein the position of the second region is defined to include a character that causes recognition difficulty when the image is rotated from the erecting direction in the second region.

12. The image processing device according to claim 3, wherein the position of the second region is defined to include a character that causes recognition difficulty when the image is rotated from the erecting direction in the second region.

13. The image processing device according to claim 4, wherein the position of the second region is defined to include a character that causes recognition difficulty when the image is rotated from the erecting direction in the second region.

14. An image reading apparatus comprising:
  a scanner that reads an image formed on a document; and
  a processor and associated memory configured to:
    obtain image information of a second region to detect by way of character recognition of the second region an erecting direction of the image read by the scanner, the second region being defined in the image in advance for each of a plurality of types of the document according to a criterion different from a criterion for defining a first region in the image, in which character recognition is performed; and
    output character information of the first region, the character information being recognized in accordance with the erecting direction of the image obtained from the image information,
  wherein an erecting direction of the first region is indeterminable by the character recognition.

15. A non-transitory computer readable medium storing a program that causes a computer to execute functions, the functions comprising:
  obtaining image information of a second region to detect by way of character recognition of the second region an erecting direction of an image formed on a document, the second region being defined in the image in advance for each of a plurality of types of the document according to a criterion different from a criterion for defining a first region in the image, in which character recognition is performed; and
  outputting character information of the first region, the character information being recognized in accordance with the erecting direction of the image obtained from the image information,
  wherein an erecting direction of the first region is indeterminable by the character recognition.

16. The image processing device according to claim 1, wherein the second region is separate and distinct from the first region.

17. The image processing device according to claim 1, wherein the second region is outside of the first region.

* * * * *